United States Patent [19]
Brott, II

[11] Patent Number: 5,216,830
[45] Date of Patent: Jun. 8, 1993

[54] ARTIFICIAL FISHING LURE AND METHOD OF MAKING SAME

[76] Inventor: Louis J. Brott, II, 508 5th St. SW., Little Falls, Minn. 56345

[21] Appl. No.: 695,956

[22] Filed: May 6, 1991

[51] Int. Cl.⁵ ............................................. A01K 85/00
[52] U.S. Cl. .................................. 43/42.39; 43/42.53
[58] Field of Search ................. 43/42.39, 42.47, 42.37, 43/42.24, 42.25, 42.28, 42.4, 42.41, 42.45, 42.48, 42.5, 42.53

[56] References Cited

U.S. PATENT DOCUMENTS

| | | | |
|---|---|---|---|
| 1,644,151 | 10/1927 | Rodgers | 43/42.24 |
| 1,801,940 | 4/1931 | Stanley | 43/42.28 |
| 1,963,380 | 6/1934 | Peters et al. | 43/42.5 |
| 2,241,767 | 5/1941 | Cullerton | 43/42.48 |
| 2,295,765 | 9/1942 | Weber | 43/42.48 |
| 3,504,454 | 4/1970 | Turbeville et al. | 43/42.53 |
| 4,796,378 | 1/1989 | Krueger et al. | 43/42.38 |
| 4,862,629 | 9/1989 | Ryan | 43/42.47 |

Primary Examiner—Richard K. Seidel
Assistant Examiner—James Miner

[57] ABSTRACT

An artificial fishing lure has a hook with an upward curl, a front blade having a forward wide end to which a fishing line is attachable, a narrow back end to which the hook is connected, and a central metal body which is molded around the blade narrow end and the front of the hook; the body has a lower pedestal and a center of gravity forward of the pedestal to rotate the lure over onto the blade when the lure sits on a bottom under water, a collar for a skirt tail on the back of the body and a weed deflector extends upward from the body, the blade wide end extends upwards from the body and has a front concave surface which faces forward and downward from the body. The lure is exceptionally effective at casting, fishing in water with many obstructions, and fishing on the bottom, on the surface, and at any level in between. A method of making a lure has the steps of providing a hook and a blade, bending the blade into majority area and minority area ends, attaching the hook to the minority end, and molding a body over the minority end and the front of the hook to fix the blade and hook to each other.

7 Claims, 3 Drawing Sheets

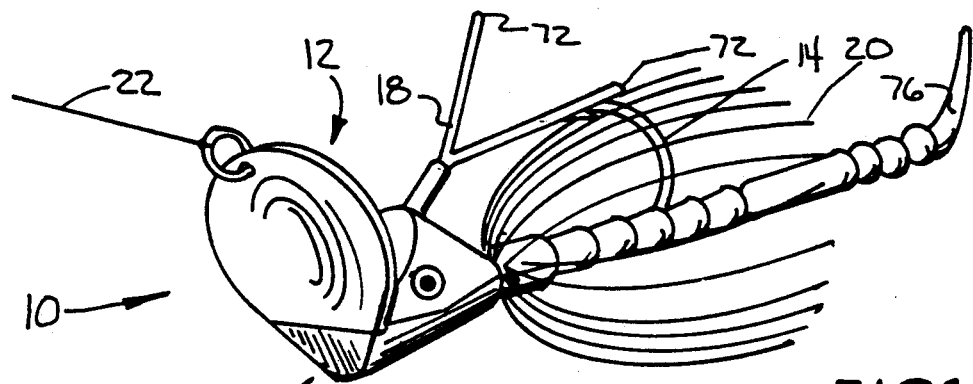
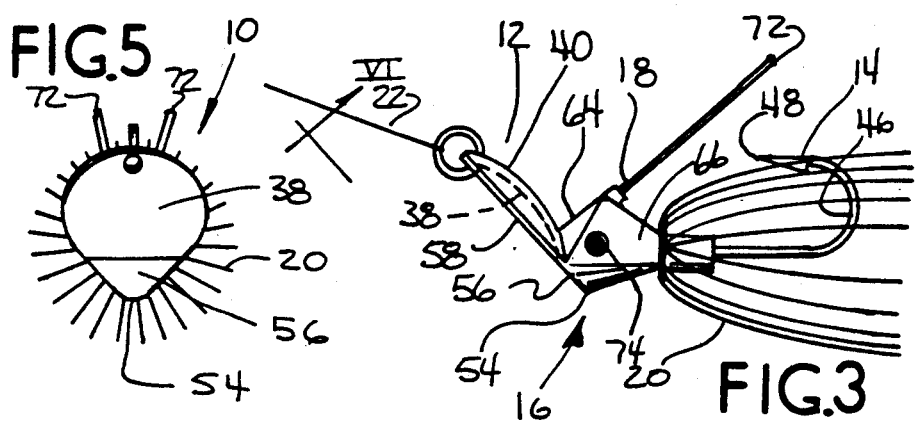

ARTIFICIAL FISHING LURE AND METHOD OF MAKING SAME

LJB - 91.0405

LEXICON

| | |
|---|---|
| 10 | LURE |
| 12 | BLADE |
| 14 | HOOK |
| 16 | BODY |
| 18 | WEED DEFLECTOR |
| 20 | SKIRT TAIL |
| 22 | FISHING LINE |
| 24 | WIDE END (large) |
| 26 | NARROW END (small) |
| 28 | LINE APERTURE of blade |
| 30 | HOOK APERTURE |
| 32 | BEND LINE IN 12 |
| 34 | MAJORITY AREA END |
| 36 | MINORITY AREA END |
| 38 | CONCAVE SURFACE |
| 40 | CONVEX SURFACE |
| 42 | EYE |
| 44 | SHANK |
| 46 | CURL |
| 48 | POINT |
| 50 | EYELET, |
| 50A | ALTERNATIVE HOOK CONNECTOR |
| 52 | LOWER BODY PYRAMID |
| 54 | PEDESTAL |
| 56 | TRIANGULAR SURFACE |
| 58 | BOUNDARY EDGE OF BLADE |
| 60 | SIDE TRIANGULAR SURFACES |
| 62 | UPPER BODY PYRAMID |
| 64 | FORWARD SURFACE |
| 66 | SIDE SURFACES |
| 68 | SKIRT HOLDER |
| 70 | BASE OF DEFLECTOR |
| 72 | TINES OF DEFLECTOR |
| 74 | EYES |
| 76 | RUBBER WORM |
| 76A | MINNOW |
| 78 | CENTER OF GRAVITY |
| 80 | |

BACKGROUND OF THE INVENTION

1. Field of the Invention

This invention pertains to a new and improved artificial fishing lure having a front blade, a central body, and a trailing hook, and to a method of making this new lure.

2. The Prior Art

The closest known prior art is an artificial fishing lure sold under the trademark "ARBOGAST JITTERBUG." This lure is cataloged by and/or found in most fishing tackle retailers. This particular lure is marked "PATENT NOS. 2207425."

This particular lure has an elongate buoyant body typically painted in green frog colors, a front blade that is wider than it is long and with two opposed wings, one blade wing extends out on each side of the body, the front of the blade is concave, and one or more hooks are moveably attached to the bottom of the body. The lure typically has two treble hooks hung on a forward and a back hook holder. The blade has an eye in its upper front end for securement to a fishing line. This lure has been commercially and sportingly successful for about 40 years.

The JITTERBUG is typically used for fishing bass, northern pike and other surface feeding carnivorous fish. This lure floats on the surface and makes considerable commotion when it is pulled over the water. The lure has significant limitations, however. It does not troll well. It tends to foul when casted because the hooks tangle on the retrieval line. It tends to catch cattails, lily pods and other surface weeds. It does not throw far when casted. It will not sink and is a surface lure only. When this lure is overthrown onto the bank, it snags trees, branches, brush and so forth. This lure snags on logs and tree falls in the water. This lure will not effectively pull a plastic worm pork rind or the like. The JITTERBUG is generally effective only in shallow water and only during smooth water conditions.

Typical prior art deep lures, i.e., non-buoyant sinking lures are called "JIGS" and typically have a lead body molded onto a hook adjacent the hook eye. There are all kinds of jigs. One of the biggest problems with jigs is that they have little or no "action." Jigs cast well and good distances and accuracy are attainable. Jigs also tend to foul in tree branches, snags, rocks, and the like. The typical jig deadfalls in water and hits the bottom randomly. The hook may point up, down or sideways when a typical jig falls to the bottom. Jigs do not pick up off the bottom when pulled, and snag on bottom objects. Jigs are a bottom bait and are not useable for surface fishing. Jigs also tend to foul when thrown into brush. The jig lure tends to wrap around a tree branch and tie the lure to the tree. As of this date, there is no known jig being commercialized which provides a good swimming motion.

The 1991 catalog from CABELA'S, 812 13th Ave., Sidney, NB 69160 has "walking jig systems" shown and described on page 39, that is represented to walk along the bottom and be snagfree. A "walleye swimming jig" on page 42 is represented to have a swimming action. Page 74 of this catalog has a recap on various jig styles, and shows and discusses "wabble head," "standup," "swimming," and "walking" jigs.

The Great American Fishing Company, PO Box 3410, Sioux City, IA 51102 has and offers an artificial lure they call the "WIGLY CRAWLER," under the "LAZY IKE" trademark. This lure has a bent metal blade which is affixed to a single hook by what looks to be a lead rivet. This lure has a trailing hook worm attached to an aft end of the main hook. This lure has no weedless structure or function, and its hook sits on the bottom while the blade projects up. This lure also tends to foul when being casted. When this lure sits on the bottom, it is motionless.

Being a tournament fisherman for many years, I had come to the conclusion that I and other fishermen (and women) wanted and needed a single lure that could be fished almost anywhere, with success in catching fish. I wanted a weedless lure that could be fished in lily pads, reed patches and in and around fallen logs and brush. I also wanted this lure to be able to effectively fish rocky bottom areas, and rip-rap, this lure also needs to be weedless in shallow, mid-depth, and deep weeds. I also wanted and needed a lure that will entice a fish to strike it; in my opinion this requires a very strong swimming action at all retrieval speeds, be it slow, fast, or in between. The lure must also retrieve at a great variation in speeds without tipping on its side, or rolling over. This lure also must be usable as a shallow water "buzz bait" style, as a normal mid-depth lure, and a bottom "crank bait" style of operation. I have also realized that it is highly deniable for this lure to stand upright when it is on the bottom.

OBJECT OF THE INVENTION

It is an object of this invention to provide a new artificial fishing lure.

It is an object of this invention to provide a new fishing lure having a non-buoyant body and hook, and a lifting blade in front of the body.

It is an object of this invention to provide a new sinking jig type lure which will run on or adjacent to the bottom, to the surface or at any level in between during retrieval.

It is an object of this invention to provide a new lure which will cast for exceptional distance, and which will not foul the fishing line during casting.

It is an object of this invention to provide a new lure with a very active swimming motion, that can be run at almost any depth from surface to bottom, and in between.

It is an object of this invention to provide a new swimming type lure, that will sit on its nose when it falls to and sits upon the bottom.

It is an object of this invention to provide a new lure that is weedless and has a tendency not to snag on tree branches and brush, either on shore or submerged.

It is an object of this invention to provide a new method of making an artificial fishing lure.

It is an object of this invention to provide a single fishing lure which is weedless, and which can be effectively retrieved on the surface, on the bottom, and at levels in between, and which can be fished effectively in rocks.

It is an object of this invention to provide a new and improved artificial fishing lure with a front blade, a rear hook, a unique central body, a pedestal on the body, a weed deflector between the blade and the hook, and a skirt tail on the body.

SUMMARY OF THE INVENTION

An artificial fishing lure has a non-buoyant central body, a hook with an upward curl and a front blade rigidly secured to the body, the blade extends forward and upward from the body and has a concave front side facing forward and downward from the body, and a line connection is in top of the blade above this level of the body.

An artificial fishing lure has a hook, a front blade having a line connector and a hook connector to which the hook is connected, a bend line in the blade between the connectors with a majority of the area of the blade being in front of and above the bend line, a concave blade surface facing forward and downward, a body rigidly secured to the blade behind the bend line and to a front end of the hook, a pedestal on an underside of the body, and a center of gravity in the lure, when immersed in water, which is forward of the pedestal.

A method of making an artificial fishing lure has the steps of providing a blade having a hook connector in one end and a line connector in the other end, connecting a fish hook to the hook connector, and molding a one-piece body over the blade hook connector and the front of the hook, and fixing the hook and blade with respect to each other with the body.

BRIEF DESCRIPTION OF THE DRAWINGS

FIG. 1 is a frontal perspective view of the preferred embodiment of an artificial fishing lure according to the present invention;

FIG. 2 is a top plan view of the lure of FIG. 1;

FIG. 3 is a side elevational view of the lure of FIG. 1;

FIG. 4 is a bottom view of the lure of FIG. 1;

FIG. 5 is a front elevational view of the lure of FIG. 1;

FIG. 6 is a plain view from lines VI—VI in FIG. 3;

DESCRIPTION OF THE PREFERRED EMBODIMENT

Figure 7:
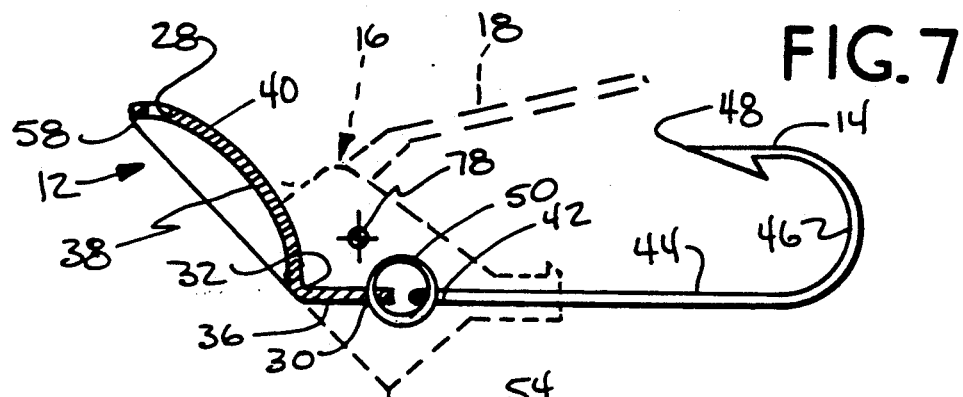
FIG. 7 is a side sectional view through lines VII—VII of FIG. 2.

In accordance with the principles of this invention, an artificial fishing lure is provided as shown in FIG. 1 and as generally indicated by the numeral 10. This lure 10 has a front blade 12, a hook 14, and a central body 16. This lure 10 preferably has a weed deflector 18 and a skirt tail 20 and the lure 10 is devised to be retrieved (pulled) by a fishing line 22 connected to the blade 12.

Figure 9:
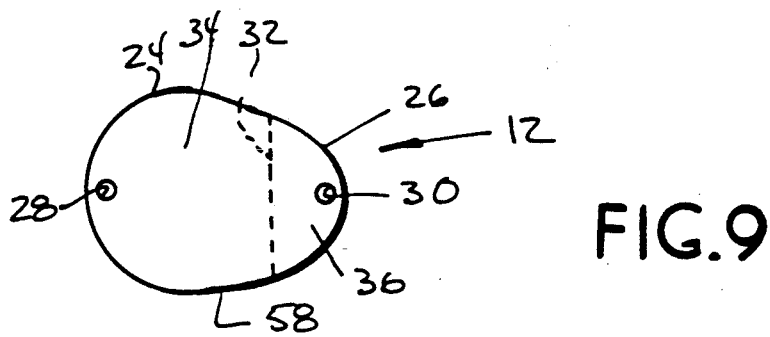
FIG. 9 is a top plain view of the blade for the lure of FIG. 1.
Figure 10:
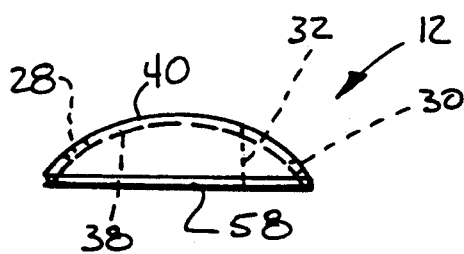
FIG. 10 is a side elevational view of the blade of FIG. 9.
Figure 11:
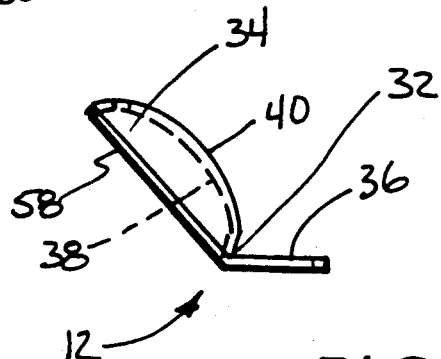
FIG. 11 is a side elevational view of the blade of FIG. 9, after completion of forming.

The blade 12 is metal and is shown in basic form in FIGS. 9, 10 and 11. The blade is generally egg shaped in plan view as shown in FIG. 9 and has a large or wide end 24 and a small or narrow end 26. A line attachment or connector aperture 28 is in the wide end 24, and a hook attachment or connector aperture 30 is in the narrow end 26. The blade is bent along a transverse bend line 32 which is in between these apertures 28, 30. The bend line 32 is nearer to the hook aperture 30 than to the line aperture 28, and if measured is about ¼ of the length of the blade 12 from the small end 26 and about ¾ of the length of the blade 12 from the large end 24. This bend line 32 divides the blade 12 into a majority area end 34 inclusive of the wide or large end 24, and a minority area end 36 which is inclusive of the small or narrow end 26. This included angle between the majority area end 34 and the minority area end 36, as shown bent in FIG. 11 is preferably 135 degrees, and is within the range of 135±30 degrees. This minority end 36 may be flattened, but the majority end 36 is provided with a forward facing concave surface 38 through which the line aperture 28 extends. This back side of the majority area end is preferably a convex surface 40. The area of the majority area end 34 is typically about 80% of the area of the blade 12.

Figure 8:
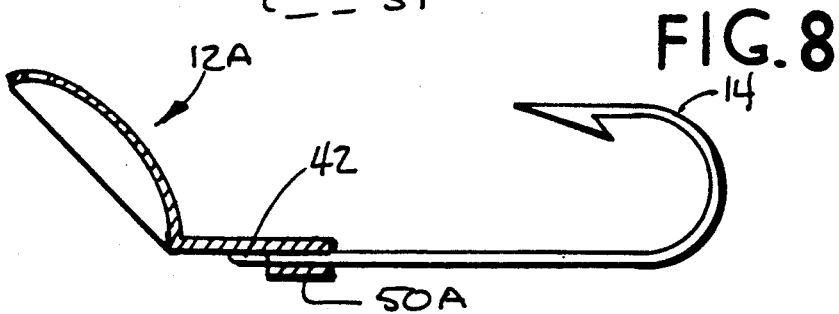
FIG. 8 is an alternative side sectional view through lines VII—VII.

The hook 14 is a conventional hook 14, and has a front attachment eye 42, an elongate shank 44 which lies on a fore-aft axis of the lure 10, a generally V-shaped curl 46 of about 180 degrees, and a forward facing point 48. The hook 14 may have a barb for catch and keep, or be barbless for catch and release. The hook eye 42 is preferably in a plane perpendicular to the plane of the curl 46. The hook attachment eye 42 is connected to the blade hook aperture 30 by an eyelet 50 as shown in FIG. 7, or by alternative formed structure 50A as shown in FIG. 8, so that there is a direct connection in tension between the blade 12 and the hook 14.

Figure 14:
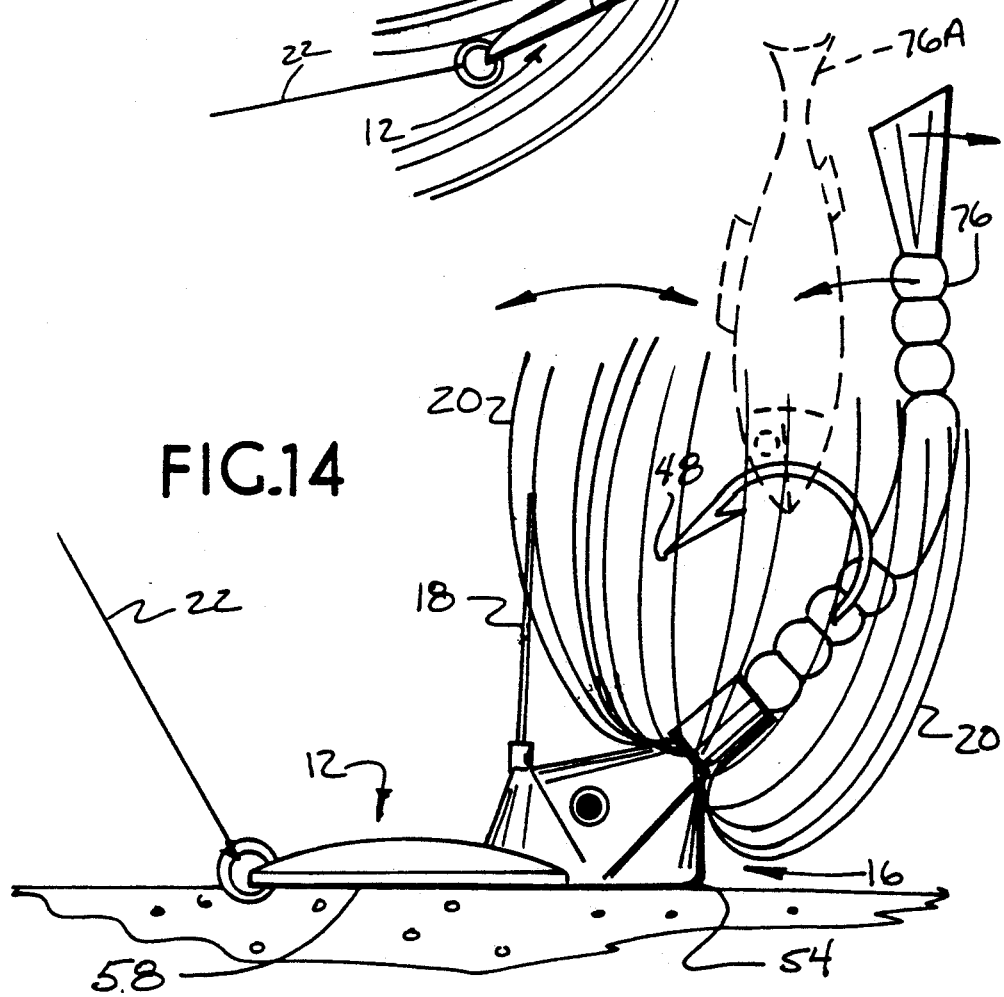
FIG. 14 is a side view of the lure of FIG. 1 in water, sitting on bottom structure.

The body 16 is cast of molten lead and completely encloses the blade minority end 36, the eyelet 50 and the hook attachment end 42. The body 16 permanently and rigidly fixes the blade 12 and hook 14 rigidly together and positionally with respect to each other. The body 16 is cast upon the previously connected blade 12 and hook 14, and as clearly shown is a central body 16 positioned in between the blade majority area end 34 and the hook curl 46. The body 16 has a lower body inverted pyramidal solid form 52, having an inverted bottom apex which forms a bottom pedestal 54 underneath the blade 12, and which is the lowest point of the lure body 16. The pedestal 54 is preferably generally co-planar with a plane of the blade majority area end 34, as defined by an outer or perimeter boundary edge 58. A frontal generally triangular shaped surface 56 extends forward from the pedestal 54 to the bend line 32. There are a pair of side triangular shaped surface 60 that extend upward from the pedestal 54 and which are behind the frontal triangular surface 56. Note in FIG. 4 that the frontal triangular surface 56 extends the blade concave surface 38 downward to the pedestal 54. On the top of the body 16 is an upper generally pyramidal body structure 62 defined by a forward surface 64 and a pair of side surfaces 66 behind the forward surface 64. As best shown in FIG. 7, this forward surface 64 is advanced upward and forward on the blade convex surface 40 from the bend line 32, and the upper body pyramid 62 is advanced forward of the lower body pyramid 52. At the back of the body 16 and on the hook shank 44 is a skirt holder 68. In the top of the body 16 is the weed deflector 18, which is preferably buoyant, and which has a base 80 embedded in the body upper pyramid 62. The preferred weed deflector 18 is conventional, made of resilient plastic, and has two upper tines 72 that are one on each side of the hook point 48. As is shown in FIG. 7, the center of gravity 78 of the body 16 and the lure 10 is forward of the pedestal 54 so that the lure 10, when it lands on the bottom and, on the pedestal 54 while immersed in water, will rotate forward about the pedestal 54 and come to rest upon the blade boundary edge 58 as is shown in FIG. 14.

The skirt tail 20 is conventional, is preferably buoyant, and is mounted backwards on the skirt holder 68. It has been found that a buoyant straight tail rubber worm 76 works best on the lure 10, as a wiggling tail.

The entirety of the exposed blade 12, the body 16 and the weed deflector 18 up to the tines 72, is painted with a single color fluorescent paint, and preferred visual eyes 74 are painted on.

Figure 12:
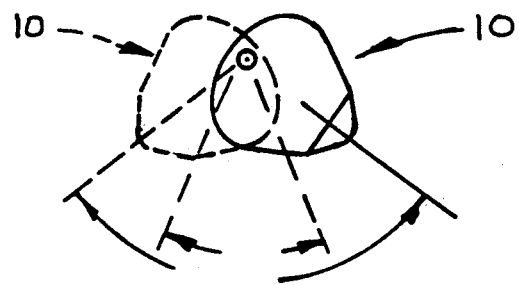
FIG. 12 is a front view showing the dynamic movement of the lure of FIG. 1.

FIG. 5 is a reasonable head-on view of the lure 10. In FIG. 12 an approximation of the swimming movement of the lure 10 is shown. An untrimmed lure 10, that is without a skirt tail 20 or worm tail 76, swings back and forth almost 180 degrees. With the lure 10 trimmed with both the skirt tail 20 and worm 76, the trimmed lure 10 swings back and forth about 90 degrees. The lure 10 tracks quite straight and gives a nice "wiggle" feel at the tip of the fishing rod. It is easy to determine if the lure 10 is fouled. The lure 10 seems to have its complete swimming motion from slow to very fast speeds.

This lure 10 is exceptionally well suited for casting. The lure 10 simply does not foul on its tether fishing line 22, it throws in a straight line, and side winds and head winds do not significantly affect it. The lure 10 goes for extraordinary distances and easily outdistances a spoon type lure, and when the lure 10 lands in tree branches, bushes, floating weeds or the like, it penetrates through without snagging.

Figure 13:
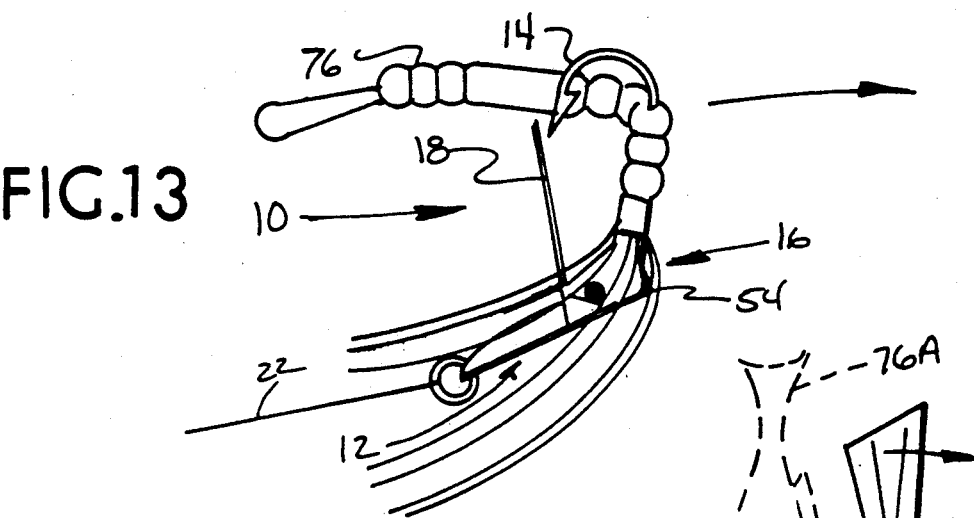
FIG. 13 is a side view of the lure of FIG. 1 being casted.

FIG. 13 illustrates the position that the lure 10 assumes during casting; within 30 feet of leaving the casting rod the lure 10 assumes the shown position and the lure 10 maintains this position until landing. The body 16 seems to go firstly with the pedestal 54 first, and pull the hook 14 and blade 12 and line 22 behind it. The skirt tail 20 tends to flow downward under and over the blade 12 and the worm 76 trails behind atop of the body 16 and blade 12. It appears that the lure 10 sails, during its cast through air, on the concave surface 38 of the blade 12. This lure 10 is definitely a long distance caster and it seems to be able to match, more or less, a lead casting bob weight. Because of the configuration that the lure 10 forms into during casting, it turns the hook 14 away from the line 22 when it lands, and penetrates through tree branches, cattails, brush and weeds without snagging the hook 14.

The lure 10 then has an unusually effective snagless performance and can most often also be pulled outward through tree branches, brush, cattails, weeds and the like again without snagging. When going over brush, the lure 10 rides up on the blade 12 and just flips over these obstructions.

When the lure 10 lands in water, the lure 10 has its complete swimming motion as it heads downward to the bottom. When the lure 10 lands on the bottom, it assumes the position shown in FIG. 14, wherein the lure 10 sits upon the pedestal 54, the blade boundary edge 58 and the lower forward surface 56. More generally, the lure 10 sits on the blade concave surface 38. The hook 14 is presented upward, the buoyant worm 76 extends upward and moves around in the water currents, and the skirt tail 20 fluffs out into a generally hemispherical configuration, concave side up, and also flutters around in the water current. The lure 10 gives a very prominent display, with a lot of motion, when sitting on the bottom and looks a lot like a crayfish type creature.

A line minnow, shown in dotted line in FIG. 76A, may be used with and/or in place of the plastic worm 76. When the lure 10 sits on the bottom, the minnow 76A waves around and acts as though it is feeding on or with the lure 10. The action is very realistic.

The lure 10 does not have much swimming motion when it is pulled straight up in water but it has all of its swimming motion when it again sinks to the bottom. The lure 10 lands relatively softly on the bottom and does not stir up bottom particulate and obstruct visibility.

When the lure 10 is retrieved, it can be pulled slowly along the bottom continuously and/or in a stop and go/stop and go, i.e., "jigging" motion. This lure 10 is far superior to a conventional lead body jig. The lead body jigs bang along the bottom and leaves a track line in the bottom and kicks up particulate bottom material that obstructs visibility. This lure 10 rides up and off of the bottom somewhat like an aircraft in ground effect and does not stir up bottom material. This lure 10 also impacts and comes over rocks much softer and easier than convention jigs. The feel of rock impact at the fish rod is only a fraction of what is felt with conventional jigs. This lure 10 also climbs up and over underwater brush very effectively, where conventional jigs tend to snag.

This lure 10 will come up to higher elevations in the water, when retrieved faster. If retrieved fast enough, the lure 10 will surface and actually run atop the surface, even though the lure 10 is not buoyant and is a sinker type. This lure 10 is extremely effective at coming through weeds and over lily pad type growths where bass, northern pike, and pan fishing excels.

As the lure 10 is approaching a viewer (be it a fish or a human) the lure 10 presents a tremendous visual appearance as the fluorescent painted blade concave surface 28 is oscillating back and forth; the lure 10 looks like a beacon on a police car, coming toward the viewer. The visual presentation from the side of the moving lure 10 is also quite dramatic. When viewed from the back, the moving lure 10 is also quite colorful and dynamic.

This lure 10 does not have a lot of motion coming straight up but consequently it comes straight up easily and without any fishing rod tip wiggle.

In use of the lure 10 in areas without trees, brush and weeds, the weed deflector 18 can be snipped off with clippers and the hook point 48 can be turned up to increase its presence. The basic lure 10 can also be equipped with alternative hooks such as a double upturned, a bait holder hook, and in embodiments where weeds and snags are not a problem, the hook 14 could even be a triple and/or present a downward curl and point. The lure 10 effectively carries a trailer, such as the rubber worm 76 or minnow 76A and can also carry a trailing stinger hook (not shown). The lure 10 works deep, shallow and at all levels in between. It is an absolutely excellent lure 10 for fishing waters with a lot of obstruction structures, or waters with structure.

In the method of manufacturing of this new lure 10, the hook 14 and blade 12, as previously described, are provided. The blade 12 has the hook aperture 30 made, and is then formed across the bend line 32. The blade 12 and hook 14 are then connected together. The body 16 is then cast of molten lead about the blade 12 and hook 14. When the lead solidifies the blade 12 and hook 14 are fixed rigidly with respect to each other. The lure 10 is painted and skirt tail 20 is installed, the lure 10 is packaged and off it goes to market.

One of the very real advantages of this lure, and admittedly this is difficult to quantify vis-a-vis existing lures, is that losses of this lure 10 on snags and obstruction are significantly reduced. A second very big advantage is that there is a greatly reduced loss of time, due to unraveling of fouls, removal of weeds and brush and so forth. This is important to tournament fishing people.

Many other advantages, features and additional objects of the present invention will become manifest to those versed in the art upon making reference to and use of the detailed description and accompanying drawings in which the preferred embodiment incorporating the principles of the present invention is set forth and shown by way of illustrative example.

Although other advantages may be found and realized and various modifications may be suggested by those versed in the art, be understood that I embody within the scope of the patent warranted hereon, all such embodiments as reasonably and properly come within the scope of my contribution to the art.

I claim as my invention

1. A non-buoyant artificial fishing lure comprising
a) a fish hook having an attachment end, an elongate shank on a fore-aft axis of the lure, an upward extending U-bend curl, and a sharp point on the front top end of the curl;
b) a front generally egg-shaped metal blade having a forward wide end and a back narrow end, hook attachment structure on the narrow end with said hook attachment end being connected thereto, line attachment structure on the wide end, a transverse bend line across the blade and in between the line attachment structure and the hook attachment structure, said transverse bend forming said blade into an obtuse angle in the range of 135±30 degrees between the wide end and the narrow end, said transverse bend being nearer to the hook attachment structure than to the line attachment structure with at least a ⅔ majority area end of the blade being on the forward wide end of the transverse bend, and a ⅓ or less minority area end of the blade being on the back narrow end side of the transverse bend;
c) a cast lead body, molded over the hook attachment end and the blade minority area end, said body fixing said hook to said blade;
d) a bottom pedestal on an underside of said body, said pedestal being aft of said blade transverse bend and generally co-planar with said blade majority area end;
e) a weed deflector extending upward from said body and in front of said hook point, said deflector being generally perpendicular to said blade majority area end;
f) a concave front surface on said blade majority area end, said concave front surface facing forward from and downward from said body; and in which
g) said body extends upward on a back side of said blade majority area and, a majority of the mass of said body being above said blade minority end and forward of said pedestal.

2. A method of making an artificial fishing lure comprising the steps of
a) providing a blade having line attachment structure in one end and hook attachment structure in a second opposite end;
b) connecting a connection end of a fish hook to said hook attachment structure in a flexible connection arrangement;
c) molding a one piece body over said hook attachment structure and said hook connection end, said molded body positionally fixing said hook with respect to said blade, said body completely enclosing said hook attachment structure and said hook connection end, said body being in between said blade and a curl of said hook, with said line attachment structure being spaced forward of a front of said body.

3. The method of claim 2, in which said body is molded by pouring molten lead over said hook attachment structure and said fish hook connector end.

4. The method of claim 2, including the further steps of bending the blade across afore-aft centerline and forming an obtuse angle between majority and minority area ends of the formal blade, and embedding the blade minority area end in the molded body.

5. The method of claim 4, including the further steps of providing the blade majority area end with an outside concave surface, positioning both the majority area end and a fish hook curl extended upward, and then molding the body between the upwardly extending majority end and the hook curl.

6. The method of claim 2, including the further step of molding a bottom pedestal on the underside of said body, and locating said pedestal aft of a center of gravity of the lure, during immersion, and locating said pedestal generally co-planar with a forward side of the blade.

7. An artificial fishing lure comprising
   a) a non-buoyant central metal body;
   b) a hook having a shank secured and fixed to said body and extending out of a back end of said body, and upward extending curl, and a forward facing point above the shank and above a highest level of the body;
   c) a front blade rigidly secured to a front end of said body, said blade extending forward and upward from said body and in front of said hook curl, said blade having a front side to the front of said body, said front side facing forward and downward from said body;
   d) means in said blade and above the highest level of the body, for attaching the lure to a fishing line;
   e) means rearward of said blade front side for standing said lure upon said blade front side when said lure is immersed in water and sitting upon an underwater bottom; and in which
   f) said hook is secured to a back bottom end of said blade independently of said body, inside of said body.

* * * * *